US008706484B2

(12) United States Patent
Takeda et al.

(10) Patent No.: US 8,706,484 B2
(45) Date of Patent: Apr. 22, 2014

(54) VOICE RECOGNITION DICTIONARY GENERATION APPARATUS AND VOICE RECOGNITION DICTIONARY GENERATION METHOD

(75) Inventors: Chiharu Takeda, Iwaki (JP); Fumihiko Aoyama, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1100 days.

(21) Appl. No.: 12/707,966

(22) Filed: Feb. 18, 2010

(65) Prior Publication Data

US 2010/0299143 A1 Nov. 25, 2010

(30) Foreign Application Priority Data

May 22, 2009 (JP) ................................. 2009-123866

(51) Int. Cl.
*G10L 15/00* (2013.01)
(52) U.S. Cl.
USPC ............. 704/231; 704/10; 704/270; 704/275; 707/740
(58) Field of Classification Search
USPC .................. 704/10, 231, 270.1, 275; 707/740
See application file for complete search history.

(56) References Cited

U.S. PATENT DOCUMENTS

| 6,505,160 | B1* | 1/2003 | Levy et al. | 704/270 |
|---|---|---|---|---|
| 6,953,886 | B1* | 10/2005 | Looney et al. | 84/615 |
| 7,260,533 | B2* | 8/2007 | Kamanaka | 704/260 |
| 7,437,296 | B2* | 10/2008 | Inoue et al. | 704/275 |
| 7,461,122 | B2* | 12/2008 | Kawana | 709/203 |
| 7,496,562 | B2* | 2/2009 | Suzuki et al. | 1/1 |
| 7,610,298 | B2* | 10/2009 | Zaytsev et al. | 1/1 |
| 8,060,368 | B2* | 11/2011 | Osawa et al. | 704/257 |
| 2005/0193092 | A1* | 9/2005 | Habermas | 709/219 |
| 2006/0114762 | A1* | 6/2006 | Kanai | 369/30.09 |
| 2007/0192290 | A1* | 8/2007 | Zaytsev et al. | 707/3 |
| 2007/0198273 | A1* | 8/2007 | Hennecke | 704/277 |
| 2008/0126092 | A1 | 5/2008 | Kawazoe et al. | |

FOREIGN PATENT DOCUMENTS

| JP | 2001-309257 | 11/2001 |
|---|---|---|
| JP | 2004-053979 | 2/2004 |
| JP | 2008-275731 | 11/2008 |

* cited by examiner

*Primary Examiner* — David Hudspeth
*Assistant Examiner* — Shaun Roberts
(74) *Attorney, Agent, or Firm* — Brinks Gilson & Lione

(57) ABSTRACT

A voice recognition dictionary generation apparatus and method for suppressing reduction of processing speed at the time of updating. The apparatus includes an input unit configured to receive a text subjected to voice recognition, a storage unit configured to store the text with respect to each file of a predetermined item, a reading data generation unit configured to analyze the text and generate a reading data, and a voice recognition dictionary configured to include content dictionaries that store therein the reading data of the text with respect to each file of the predetermined item. When the file of the predetermined item including the text stored in the storage unit is updated, a control unit detects a total number of the content dictionaries, and when the total number is smaller than a predetermined limit, the control unit generates the content dictionaries with respect to each updated predetermined item.

17 Claims, 5 Drawing Sheets

VOICE RECOGNITION DICTIONARY GENERATION APPARATUS AND VOICE RECOGNITION DICTIONARY GENERATION METHOD

RELATED APPLICATIONS

The present application claims priority to Japanese Patent Application Number 2009-123866, filed May 22, 2009, the entirety of which is hereby incorporated by reference.

BACKGROUND OF THE INVENTION

1. Field of the Invention

The present invention relates to a voice recognition dictionary generation apparatus and a voice recognition dictionary generation method, and more specifically, to generating a voice recognition dictionary with an improved processing efficiency when generating and using the voice recognition dictionary.

2. Description of the Related Art

Systems with a function of reading a text input thereto aloud (Text To Voice (TTS) engine) have been developed and widely used for a mobile phone answering service and so on. For example, in a portable service for individual users, such a system is used for a voice service of reading out information including e-mails, news articles, and market trends in response to a phone call when the user does not have any mobile terminal or a computer at hand.

Music is reproduced based on audio information by connecting a device that stores therein the audio information for reproduction to an audio device. An example of such audio information may be music data, and the music data includes tag data describing information such as a title of music, an artist name, and the like, along with digital data of the music. It has become possible to display the title of the reproduced music on a display screen based on the tag data, and to read out the title using the TTS engine. Furthermore, it has also become possible that a user enters the title of the music through voice to reproduce the music.

In order to recognize the voice spoken by the user, a voice recognition dictionary that stores therein adequate words (keywords) to be used is required. Japanese Patent Application Publication No. 2001-309257 discloses a related technique of, in order to facilitate a program search in digital television broadcasting, extracting a keyword to perform the program search from program guide information based on words corresponding to a specific word class, generating a voice recognition dictionary including reading of each keyword, and searching for a program by a voice input.

Japanese Patent Application Publication No. 2004-053979 discloses a technique of generating a voice recognition dictionary that stores therein pronunciation data that is matched with the user's pronunciation by performing a process of replacing a letter that the user does not pronounce or a letter of which pronunciation data cannot be generated by the TTS with a space, and the like.

Japanese Patent Application Publication No. 2008-275731 discloses a technique of, to generate a dictionary of recognized vocabulary, storing a part of a character string of a word and pronunciation symbols corresponding to the part as a segment pair, and generating a string of the pronunciation symbols very likely to be pronounced by the user using an occurrence probability based on the occurrence rate of the segment pair.

There is a case where a new word that is not stored in the dictionary is spoken after the voice recognition dictionary described above is generated. The new word is required when, for example, new information is used after a new music such as a newly released music compact disc (CD) is added or a new phone number is added to an address list in a mobile phone. In such a case, the voice recognition dictionary needs to be updated to include the new words.

When a part of the information (for example, one line item in the address list or one music piece in the music CD) is updated, it is generally adapted to update not only the new data but the entire data. Therefore, compared with a case of updating only the added data, it takes disadvantageously longer to generate the recognition dictionary.

On the other hand, when a part of the recognition dictionary is updated, a new file is generated every time the information is updated. To use the voice recognition dictionary, these files are accessed and the updated information in the corresponding file is used. At this time, if the number of the files is small, an affect on processing time of the voice recognition may be small, but if the number of the files is large, the processing speed decreases.

BRIEF DESCRIPTION OF THE INVENTION

According to the present invention, a voice recognition dictionary generation apparatus and a voice recognition dictionary generation method for suppressing reduction of processing speed of updating and using the voice recognition dictionary are provided.

According to an exemplary embodiment, there is provided a voice recognition dictionary generation apparatus including an input unit configured to input or send a text subjected to voice recognition from an external device or a medium, a storage unit configured to store therein the text with respect to each file of a predetermined item, a reading data generation unit configured to analyze the text and generate a reading data, a voice recognition dictionary configured to include content dictionaries that store therein the reading data of the text with respect to each file of the predetermined item, and a control unit configured to store the text input via the input unit in the storage unit. When the file of the predetermined item including the text stored in the storage unit is updated, the control unit detects a total number of the content dictionaries, and when the total number is smaller than a predetermined limit, the control unit generates the content dictionaries with respect to each updated predetermined item, thereby updating the voice recognition dictionary.

According to the voice recognition dictionary generation apparatus in this embodiment, when the total number of the content dictionaries is equal to or larger than the predetermined limit, the control unit may delete the content dictionaries corresponding to the external device or the medium from the voice recognition, extract all texts subjected to the voice recognition corresponding the external device or the medium from the storage unit with respect to each content, and generate the content dictionaries, thereby updating the voice recognition dictionary. Further, the control unit may determine that the file of the predetermined item is updated when the external device or the medium is connected and the text is stored in the file of the predetermined item in the storage unit. Furthermore, the control unit may integrate texts with the same name into a single text among the text subjected to the voice recognition to generate the content dictionaries.

According to the voice recognition dictionary generation apparatus in this embodiment, in the case where the medium is CD, the control unit may determine that information is updated when there is no artist name that is matched with the music information stored in a item of the artist name in the storage unit, or when there is no composer name that is matched with the music information stored in the item of the composer name in the storage unit. Further, in the case where the medium is CD, the control unit may determine that information is updated when there is no album title that is matched with the music information stored in an item of the album name in the storage unit, or when TOC information is different from that of a matching album title.

According to another exemplary embodiment, there is provided a voice recognition dictionary generation method including the steps of determining whether information in a file of a predetermined item including a text subjected to voice recognition stored in a storage unit is updated, detecting a total number of content dictionaries that store therein reading data of the text with respect to each file of the predetermined item when the information in the file of the predetermined item including the text obtained from an external device or a medium and subjected to the voice recognition is updated, comparing the total number of the content dictionaries with a predetermined limit, extracting the text subjected to the voice recognition corresponding to the external device or the medium with respect to each predetermined item that is updated from the storage unit when the total number is smaller than the predetermined limit, obtaining the reading data by converting the text, and updating a voice recognition dictionary by storing the reading data.

The voice recognition dictionary generation method in this embodiment may further include, after the step of comparing the total number of the content dictionaries with a predetermined limit, the steps of deleting the content dictionary corresponding to the external device or the medium from the voice recognition dictionary when the total number is equal to or larger than the predetermined limit, extracting all texts subjected to the voice recognition corresponding to the external device or the medium from the storage unit with respect to each predetermined item, obtaining the reading data by converting the texts and updating a voice recognition dictionary by storing the reading data. Further, the step of determining whether the information in the file of the predetermined item is updated may be performed by determining whether the external device or the medium is connected and whether the text is stored in the file of the predetermined item in the storage unit, and the step of obtaining the reading data may include the steps of detecting texts having an identical name from among the texts subjected to the voice recognition and integrating the texts having the identical name into a single text.

According to the voice recognition dictionary generation method in this embodiment, when the medium is CD, the step of determining whether the step of determining whether the information in the file of the predetermined item is updated may include the steps of extracting an artist name from the predetermined item, determining whether the artist name is stored in the storage unit, and determining that the information is updated when there is no identical artist name. The step of determining whether the information in the file of the predetermined item is updated may include the steps of extracting an album title from the predetermined item and determining that the information is updated when TOC information is different from that of a matching album title stored in the storage unit.

According to a voice recognition dictionary generation apparatus and a voice recognition dictionary generation method of an exemplary embodiment, difference update, in which only the renewed information is updated, is performed when the total number of the content dictionaries that store therein the reading data of the texts subjected to the voice recognition with respect to each predetermined item that form the voice recognition dictionary is smaller than the predetermined limit; and full data update, in which all the content dictionaries are updated, is performed when the total number is equal to or larger than the predetermined limit. In this manner, the update process can be performed efficiently by updating only the difference at the time of updating the voice recognition dictionary. Further, voice recognition can be efficiently performed at the time of using the recognition dictionary, though generation of the recognition dictionary takes a relatively longer time because content dictionaries generated in the past are all discarded and new content dictionaries are generated with respect to each content when the number of the content dictionaries increases.

DETAILED DESCRIPTION OF THE INVENTION

Exemplary embodiments of the present invention will be explained below with reference to accompanying drawings.

Figure 1:
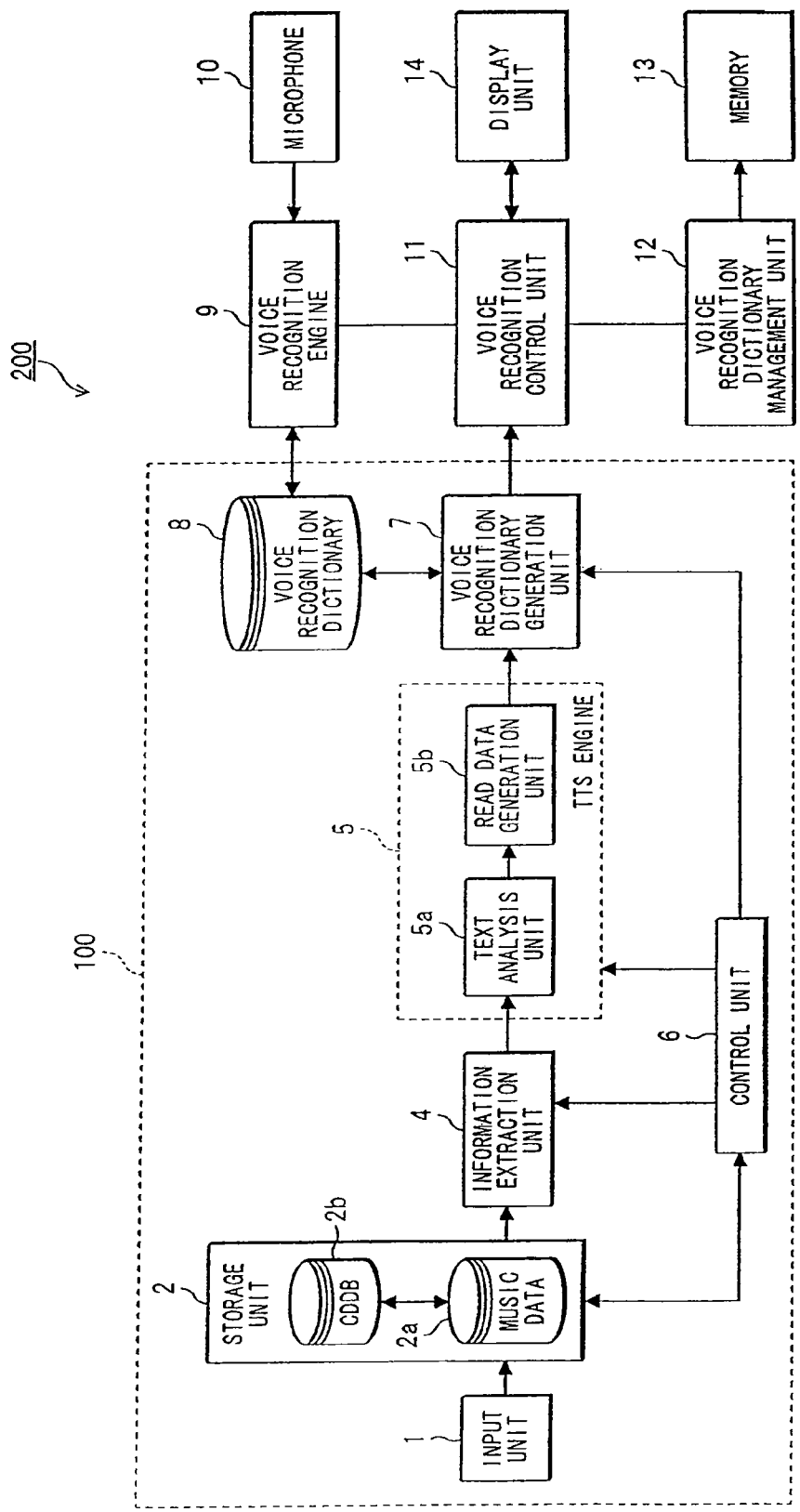
FIG. 1 is a block diagram of an information processing unit including a voice recognition dictionary generation apparatus according to an exemplary embodiment.

FIG. 1 is a block diagram of an information processing unit 200 including a voice recognition dictionary generation apparatus 100 according to an exemplary embodiment.

The voice recognition dictionary generation apparatus 100 according to the exemplary embodiment includes, as shown in FIG. 1, an input unit 1, a storage unit 2, an information extraction unit 4, a Text To Voice (TTS) engine 5, a control unit 6, a voice recognition dictionary generation unit 7, and a voice recognition dictionary 8.

The information processing unit 200 that performs a voice recognition dictionary generation process further includes a voice recognition control unit 11, a voice recognition engine 9, a microphone 10, a voice recognition dictionary management unit 12, a memory 13, and a display unit 14.

The input unit 1 is configured to be connected to various types of devices or media. For example, a digital audio device, a compact disc (CD), a digital versatile disc (DVD), a mobile phone, or the like may be connected to the input unit 1. Examples of the digital audio device include iPod (registered trademark, a digital music player produced by Apple Computer, Inc.), a hard disc drive (HDD) audio player, and a CD-Text player. The CD-Text player is a music player compliant with the CD-Text standard, and it displays text information including a title of a CD and a composer name.

The digital audio device stores therein a music file, for example, in a Moving Picture Experts Group-1 Audio Layer 3 (MP3) format, which is distributed through the Internet or the like, downloaded to a personal computer (PC) once, and then transferred from the PC. The music file contains not only the audio information to be reproduced but also music information to identify the audio information (e.g., the title, the artist name, the album title, and the like, which is also referred to as 'content' in the embodiment).

The storage unit 2 includes a hard disc, a semiconductor memory, or the like, and it stores therein the information received or input from various devices through the input unit 1 (for example, music data in the case of CD, and data in the address list in the case of the mobile phone). The storage unit 2 stores therein a database CDDB 2b that contains the music information.

The information extraction unit 4 extracts a text to be stored in the voice recognition dictionary 8 from the information input from the various devices. For example, if the input medium is a CD, the information extraction unit 4 extracts content information including the title, the artist name, and the composer name with reference to the CDDB 2b from the music data 2a.

The TTS engine 5 includes a text analysis unit 5a and a reading data generation unit 5b. The TTS engine 5 further includes a dictionary used when a voice synthesis is performed (a language analysis dictionary, a voice synthesis dictionary). The language analysis dictionary is used to perform a syntactic analysis on text information subjected to a voice synthesis process, and stores therein each word in association with its detailed information such as a writing, reading, accent information, word class information, and the like. The voice synthesis dictionary is used to convert the text information analyzed by the text analysis unit 5a into the corresponding voice (waveform) data.

When the text (character string) extracted by the information extraction unit 4 is received, the text analysis unit 5a analyzes the text based on the language analysis dictionary, and the reading data generation unit 5b generates an intermediate language (reading data) which is a character string that describes the reading and the accent of the text. The reading data may be pronunciation data associated with a pronunciation of the text.

The voice recognition dictionary generation unit 7 generates a database of the reading data generated by the reading data generation unit 5b, and stores the database in the voice recognition dictionary 8.

The voice recognition dictionary 8 includes a hard disc, a semiconductor memory, or the like, and it stores therein a voice recognition dictionary to be used by the voice recognition engine 9.

The control unit 6 includes a microcomputer, and controls each of the constituents described above to generate the voice recognition dictionary by generating the reading data from the text that is stored in the input device or media and subjected to the voice recognition. More specifically, the control unit 6 controls the information extraction unit 4 to extract a word (text) subjected to the voice recognition from various data stored in the storage unit 2, controls the TTS engine 5 to generate the reading data of the text, and controls the voice recognition dictionary generation unit 7 to generate the voice recognition dictionary.

A process of recognizing a voice spoken by the user using the voice recognition dictionary is performed by the following constituents.

The voice recognition control unit 11 extracts the word to be recognized from the voice recognition dictionary 8 into the memory 13 via the voice recognition dictionary management unit 12 to make the word an object of the voice recognition. The voice recognition control unit 11 also controls the voice recognition engine 9 to recognize the voice spoken by the user and receive the voice, such as a user request, through the microphone 10.

The voice recognition engine 9 extracts a feature quantity by performing an acoustic analysis on the input voice, and compares the feature quantity with an acoustic model to obtain a plurality of pronunciation symbol strings. The voice recognition engine 9 selects the most probable word from among words subjected to the recognition based on the pronunciation symbol strings. Based on the recognition result, the voice recognition engine 9 displays information corresponding to the user's request on the display unit 14.

When an external device or a medium is connected to the voice recognition dictionary generation apparatus 100 configured as above, the voice recognition dictionary generation apparatus 100 extracts the word subjected to the voice recognition and generates the voice recognition dictionary. At this time, the voice recognition dictionary generation apparatus 100 generates the voice recognition dictionary with consideration of an improvement of the processing time for generating and using the voice recognition dictionary. For example, when a CD that stores therein music data is connected to the voice recognition dictionary generation apparatus 100 and a ripping is performed, the voice recognition dictionary generation apparatus 100 stores the ripped music data and the accompanying music information including the title and the like in the storage unit 2. The time point at which the music information is stored is used as a trigger to update the voice recognition dictionary 8.

When the voice recognition dictionary 8 is updated, the state of the file configuration of the voice recognition dictionary 8 is detected, and it is determined whether to update a part of the dictionary or the whole dictionary based on the detected state.

There are two ways of updating the voice recognition dictionary 8. One is to perform a generation process of the voice recognition dictionary 8 only on content information added by ripping, copying, or the like (hereinafter, the information will be referred to as difference information, and the process will be referred to as difference update process). The other is to perform the generation process of the voice recognition dictionary 8 on the entire content information (hereinafter, referred to as full data update process).

The content (predetermined item) means additional information such as, in the case of music data, the title of music, the artist name, and the album title included in the music information.

The update process of the voice recognition dictionary 8 associated with the music data is explained below assuming a case of ripping a CD.

Figure 2A:
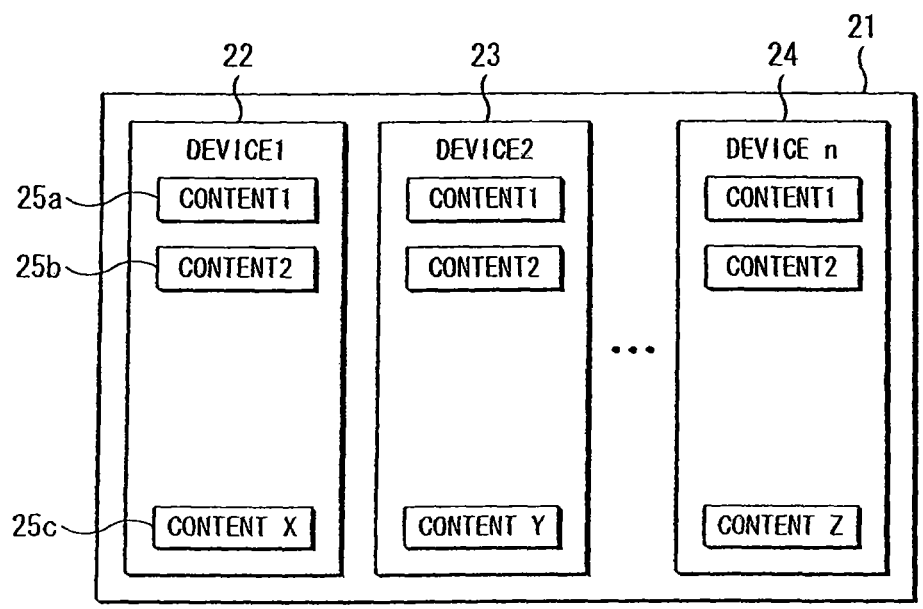
FIG. 2(a) shows an example of a configuration of a voice recognition dictionary.

A file configuration 21 of the voice recognition dictionary 8 is explained first. FIG. 2(a) is a schematic diagram conceptually showing the file configuration 21 of the voice recognition dictionary 8. As shown in FIG. 2(a), the voice recognition dictionary 8 stores therein recognition dictionaries of the words obtained from the various devices associated with each of the devices (22 to 24). For example, the device 1 (22) stores therein dictionaries generated based on the data obtained from a CD, and the device 2 (23) stores therein dictionaries generated based on the data obtained from an iPod.

In each of the devices (22 to 24), dictionaries are stored together with respect to each content. Dictionaries are stored in different files, such as a file of a content 1 (25a), a file of a content 2 (25b), and a file of a content X (25c) in the device 1 (22) as shown in FIG. 2(a). For example, if the device 1 is a CD, in a folder named 'device 1,' the title extracted from the CD is stored in a file 'content 1 (title),' and the artist name is stored in a file 'content 2 (artist).' These individual files are referred to as content dictionaries.

Figure 2B:
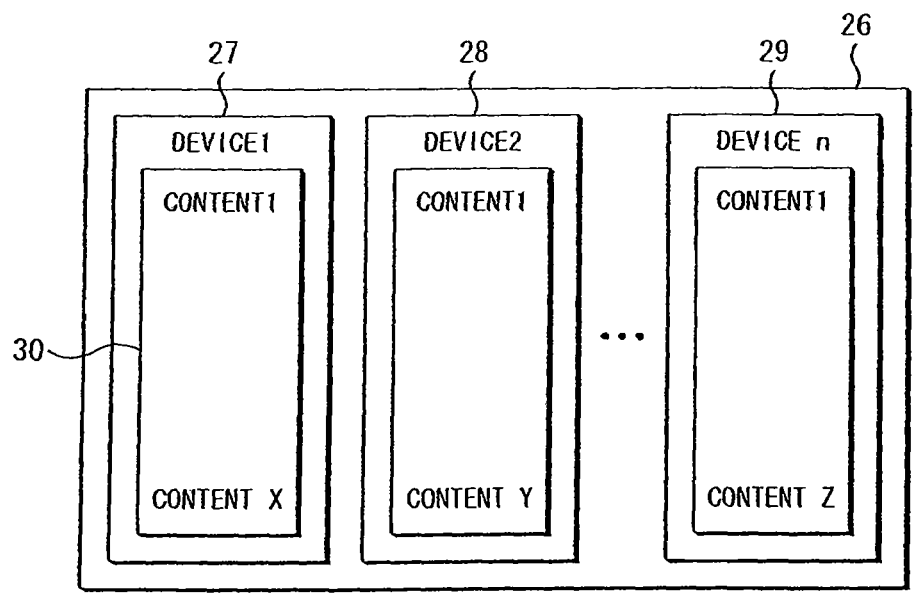
FIG. 2(b) shows an example of how information obtained from each device is stored.

On the other hand, FIG. 2(b) shows an example of a file configuration 26 of the storage unit 2 in which the music information and the like are stored when a medium such as a CD or a device is connected thereto. The data is stored in a single folder with respect to each content for each device. For example, a device 1 (27) stores therein the data obtained from the CD, and a device 2 (28) stores therein the data obtained from the iPod.

In each of the devices (27 to 29), all of the content information is stored together in a single file.

Figure 3:
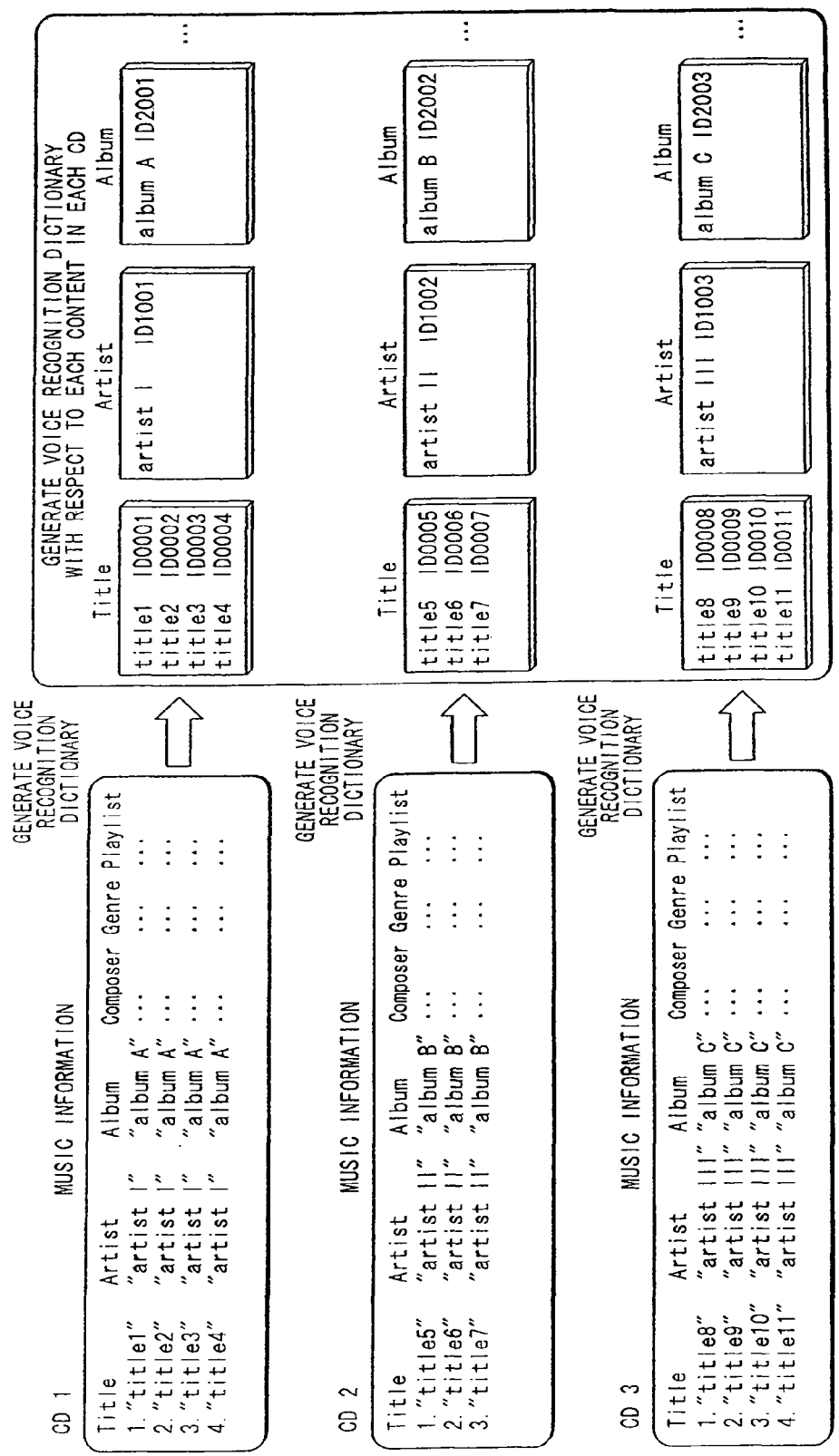
FIG. 3 is a schematic diagram showing an outline of generating the voice recognition dictionary for music search at the time of a difference update.
Figure 4:
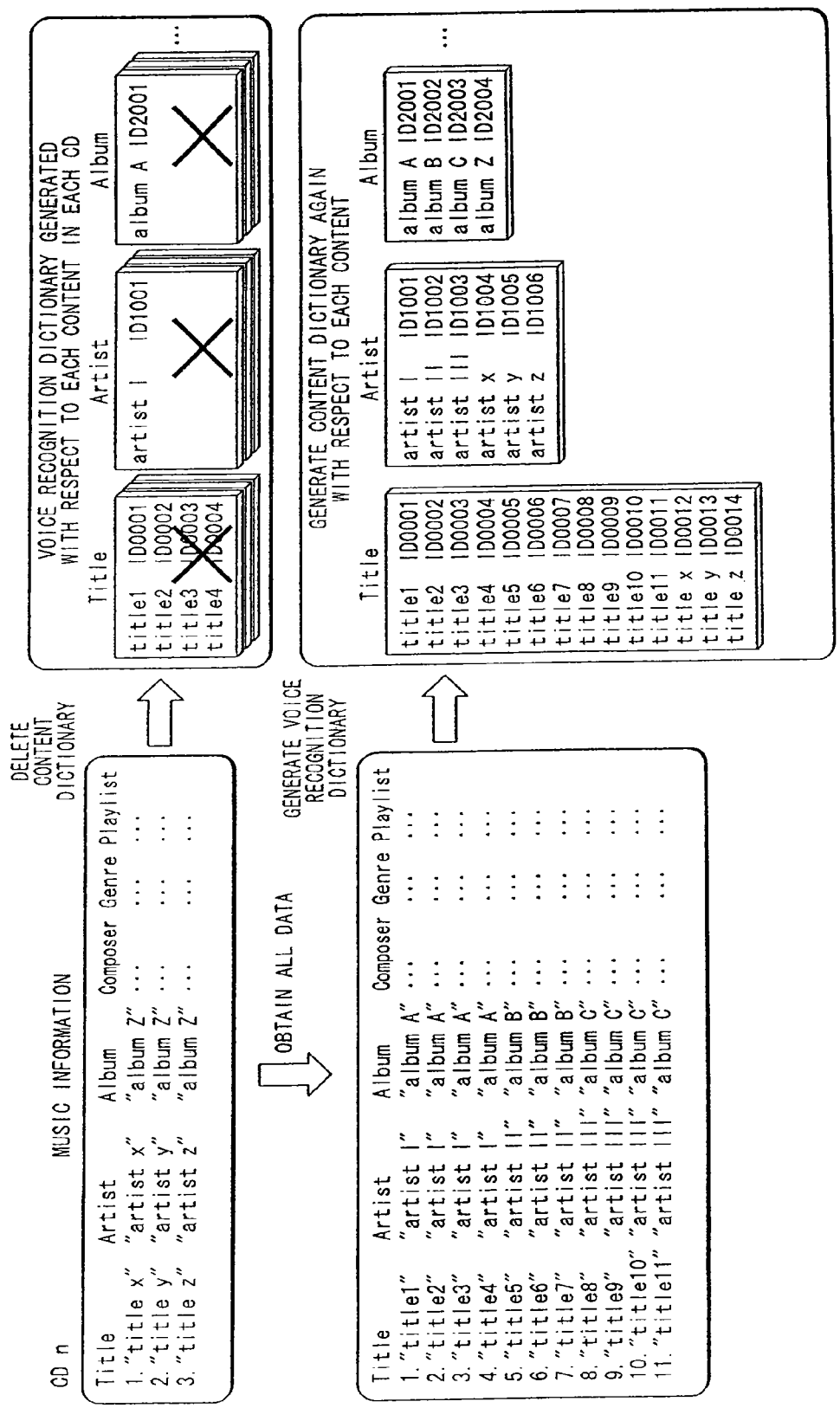
FIG. 4 is a schematic diagram showing an outline of generating the voice recognition dictionary for music search at the time of full data update.

With reference to FIGS. 3 and 4, a method of generating the voice recognition dictionary for music search is explained. FIG. 3 shows an outline of the voice recognition dictionary generating method at the time of the difference update, and FIG. 4 shows an outline of the voice recognition dictionary generating method at the time of the full data update.

FIG. 3 shows an example of ripping data of CDs connected to the input unit 1 to the storage unit 2, in which the ripping is performed in the order of a CD 1, a CD 2, and a CD 3.

First, by ripping the CD 1, the music information is stored in the storage unit 2. The music information includes contents such as the title, the artist name, the album title, the composer name, a genre, and a playlist.

When these data are stored in the storage unit 2, the control unit 6 detects the number of the content dictionaries stored in the voice recognition dictionary 8, and determines whether the number exceeds a limit. If the number does not exceed the limit, the control unit generates the voice recognition dictionary for each of the above-listed contents. The limit is an upper limit to the number of dictionaries each content can include, and it is set in the storage unit 2 in advance.

In FIG. 3, "title 1", "title 2", "title 3", and "title 4" are extracted as the content data (titles) of the CD 1, and texts of these titles are sent to the TTS engine 5 to generate the reading data. The voice recognition dictionary 8 is generated based on the reading data, identification numbers (ID0001 to ID0004) are applied respectively to the words, and the content dictionaries of the titles are stored in the voice recognition dictionary 8.

In the same manner, content dictionaries of the artist name, the album title, and the like are generated and stored in the voice recognition dictionary 8.

Next, it is assumed that the CD 2 is ripped and that the content data of the CD 2 is stored in the storage unit 2. Triggered by the timing of storing the content data, the control unit 6 detects the number of the content dictionaries stored in the voice recognition dictionary 8, and determines whether the number exceeds the limit, in the same manner as ripping the CD 1. If the number does not exceed the limit, the control unit generates the voice recognition dictionary for each of the contents.

In FIG. 3, "title 5", "title 6", and "title 7" are extracted as the content data (titles) of the CD 2, and texts of these titles are sent to the TTS engine 5 to generate the reading data. The voice recognition dictionary 8 is generated based on the reading data, identification numbers (ID0005 to ID0007) are applied respectively to the words, and the content dictionaries of the titles are stored in the voice recognition dictionary 8.

In the same manner, the content dictionaries of the artist name, the album title, and the like are generated and stored in the voice recognition dictionary 8.

The same voice recognition dictionary generation process is performed on the CD 3 shown in FIG. 3. As for the ripped data of the CD 3, the content dictionaries are generated with respect to each content stored in the CD 3 and stored in the voice recognition dictionary 8, in the same manner as the CD 1 and the CD 2.

On the other hand, if the number of the content dictionaries exceeds the limit, the full data update process shown in FIG. 4 is performed.

As explained with reference to the example shown in FIG. 3, in the difference update process, the dictionary is generated only for the information updated by the ripping. At this time, for the music data that has not been updated, the voice recognition dictionary generated before is used as it is, instead of regenerating the voice recognition dictionary. In this manner, the time for the update process of the voice recognition dictionary can be reduced.

By performing the difference update process as described above, a new content dictionary is generated in the voice recognition dictionary every time the difference update process is performed. Therefore, the same number of the content dictionaries as the number of times the ripping has been performed are generated, and a single content dictionary is also generated for each of the contents such as the artist name and the album title.

If ripping of a CD is performed a plurality of times, the number of the content dictionaries may not exceed the limit in the beginning, but the number of the content dictionaries may finally exceed the limit while the ripping is repeated. Therefore, as the difference update process is repeated, the number and the size of the content dictionaries may immensely increase, thereby increasing time to access the voice recognition dictionary.

To solve this problem, the full data update process is performed to decrease the number of the content dictionaries. FIG. 4 is a schematic diagram for explaining an outline of the full data update process.

In FIG. 4, it is assumed that, when a $CD_n$ is ripped and the music information is stored in the storage unit 2, the control unit 6 detects the number of the content dictionaries and the number exceeds the limit. In such a case, all of the voice recognition dictionaries 8 generated in the past with respect to each content of all CDs are discarded.

After that, the content data of the CDs stored in the storage unit 2 is obtained, and not the data at the time of each ripping but all the content data are gathered to generate the content dictionary with respect to each content.

As shown in FIG. 4, for example, if the content is the title, data of the titles ripped in the past ("title 1" to "title 11" and "title x" to "title z") are generated as a single content dictionary. The same process is performed on other contents (e.g., the artist name and the album title).

As shown in FIG. 4, in the case of the full data update, the voice recognition dictionary is reconstructed with respect to each content (e.g., the artist name and the album title) based on the music information stored in the storage unit 2. In this case, the number of the content dictionaries is equal to the number of the contents such as the artist name. Therefore, although the size of the content dictionary increases by increasing the data size in a single content, the number of the content dictionaries does not increase. Accordingly, the access time for reading the content dictionary can be reduced.

There may be content data of the same artist name or the same album title. Such content data with the same name are integrated to generate a single content dictionary.

Among the content information, the artist names and the composer name are treated as the difference to determine that the information has been updated only when there are not same character strings in the music information ripped in the past.

For example, in FIG. 3, because the artist name of the all four music in the content information is "artist I," only one "artist I" is stored in the content dictionary (artist) as the artist name in the content information. The same process is performed in the case of the full data update. For example, in FIG. 4, the content dictionary (artist) stores therein one each of "artist I," "artist II," "artist III," "artist x," "artist y," and "artist z" as the artist name in the content information.

In the case of the title and the album title, it is also determined that the information has been updated when the same character string is not included in the music information ripped in the past. Furthermore, even when the same character string is included, it is not the same music or the same album as long as TOC information is different, and therefore the update is determined depending on whether the TOC information is different.

As described above, generation of the voice recognition dictionary 8 by the difference update shown in FIG. 3 requires a short time for the update process, but there is a disadvantage that the access time increases as the update is repeated. On the other hand, the generation of the voice recognition dictionary 8 by the full data update shown in FIG. 4 can reduce the access time though the update process takes a longer time.

Therefore, it should be determined whether to perform the difference update or the full data update in consideration of the access time when using the voice recognition dictionary 8. As a criterion for the determination, the limit to the number of the content dictionaries is provided.

The limit to the number of the content dictionaries is determined and stored in the storage unit 2 in advance. For example, pluralities of content dictionaries are generated and the time until the content dictionaries can be used is measured, thereby determining the number of the content dictionaries allowed to be used within a predetermined time.

When the storage unit 2 of the voice recognition dictionary generation apparatus 100 stores therein the music information for update, a dictionary for the voice recognition is generated based on the music information. At this time, it is determined whether to perform the difference update process or the full data update process on the voice recognition dictionary based on the number of the content dictionaries stored in the voice recognition dictionary.

Next, a generation process of the voice recognition dictionary 8 is explained with reference to a flowchart shown in FIG. 5. It is assumed in this process that the limit to the number of the content dictionaries has been determined and stored in the storage unit 2 in advance.

Figure 5:
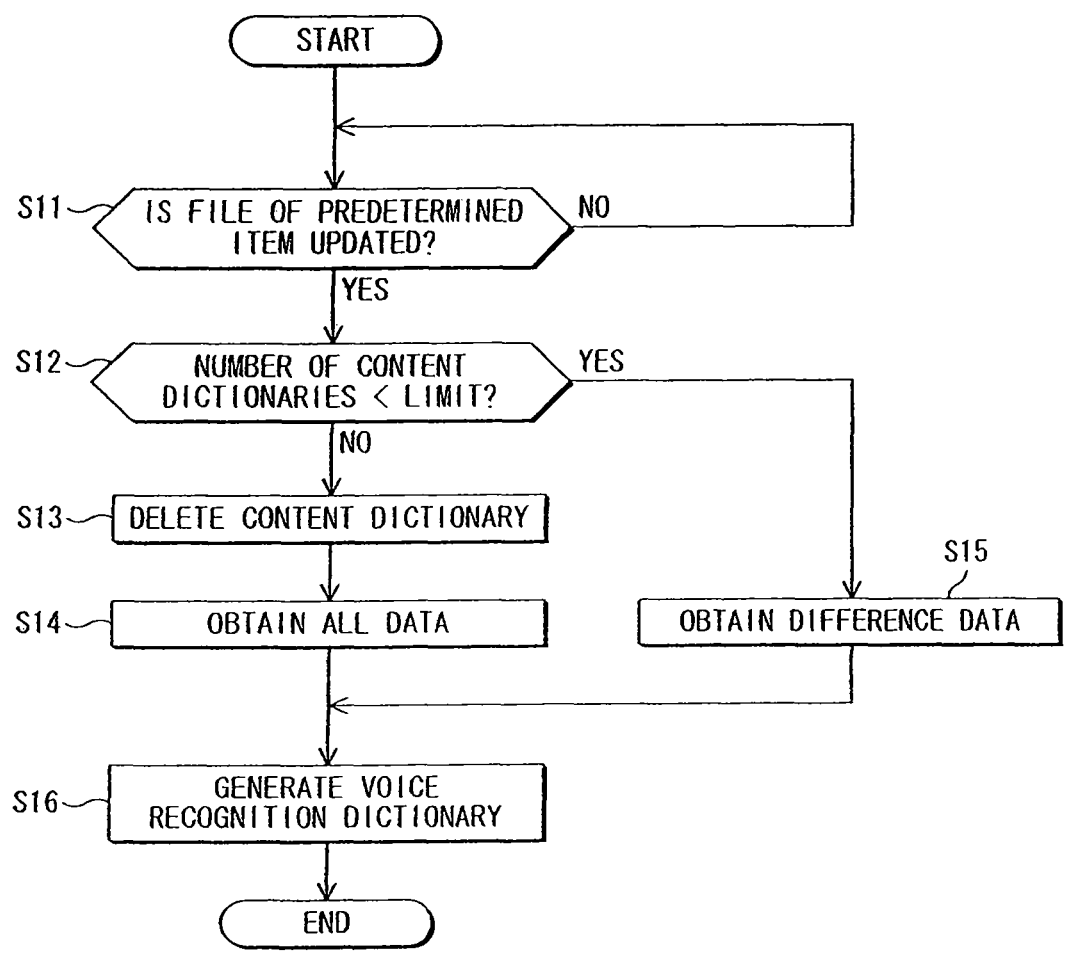
FIG. 5 is a flowchart of an exemplary process of generating the voice recognition dictionary.

First, at Step 11 in FIG. 5, it is determined whether the information in a file of the predetermined item that includes the word subjected to the voice recognition stored in the storage unit 2 is updated. It is determined that the information is updated when the external device or the medium is connected to the voice recognition dictionary generation apparatus 100 and the information in the file of the predetermined item is stored in the storage unit 2. The voice recognition dictionary generation apparatus 100 waits until the information is updated, and the process moves on to Step 12 when the information is updated.

At Step 12, it is determined whether the number of the content dictionaries is smaller than the limit. The number of the content dictionaries may be detected by accessing the voice recognition dictionary 8, or referring to a counter of the number of the content dictionaries prepared in advance. When the number of the content dictionaries is equal to or larger than the limit, the process moves to Step 13, and when it is smaller than the limit, the process moves to Step 15.

Step 13 and Step 14 are performed in a case where the number of the content dictionaries is equal to or larger than the limit, and correspond to the full data update process. At Step 13, the content dictionaries that form the voice recognition dictionary 8 are deleted.

At Step 14, all the data of music information is obtained from the music data stored in the storage unit 2. The storage unit 2 stores therein, as shown in FIG. 4, the music data of all the CDs with respect to each content such as the artist name and the album title, and not with respect to each ripped CD.

On the other hand, when the number of the content dictionaries is smaller than the limit, the difference data of music information is obtained from the storage unit 2 at Step 15. The difference data is the music data of the newly ripped CD, which is generated with respect to each content such as the artist name and the album title, as shown in FIG. 3. However, as seen from FIGS. 3 and 4, the size of the content dictionary is smaller in the case of the difference update compared with the case of the full data update.

At Step 16, the generation process of the voice recognition dictionary 8 is performed. To generate the voice recognition dictionary 8, the content dictionaries are generated with respect to each content from the music information obtained at Step 14 or Step 15. In the case of the music information, an artist dictionary, a title dictionary, an album title dictionary and the like are generated as the content dictionaries.

To generate the content dictionaries in the case of the difference update process, a content dictionary is generated for each content of the music information. At this time, data having the same name are integrated into one dictionary. The generation of the content dictionaries in the case of the full data update process is performed in the same manner, where a content dictionary is generated for each content of the music information.

In the process of generating the voice recognition dictionary, a text for the voice recognition dictionary generation is sent to the TTS engine 5, thereby generating the reading data corresponding to each text and storing it in the voice recognition dictionary 8.

As explained above, according to the voice recognition dictionary generation apparatus and the voice recognition dictionary generation method of embodiments of the present invention, the difference update, in which the renewed information is updated, is performed when the total number of the content dictionaries generated with respect to each content that form the voice recognition dictionary is smaller than the predetermined limit, and the full data update, in which all the content dictionaries is updated, is performed when the total number is equal to or larger than the predetermined limit. In this manner, the update process can be performed efficiently by updating only the difference at the time of updating the voice recognition dictionary. Furthermore, voice recognition can be efficiently performed at the time of using the recognition dictionary, though the generation of the recognition dictionary takes a relatively longer time because content dictionaries generated in the past are all discarded and new content dictionaries are generated with respect to each content when the number of the content dictionaries increases.

Although the number of the content dictionaries that form the voice recognition dictionary is used as the criterion for determining whether to perform the difference update process or the full data update process, the present invention is not limited to this, and the size of the content dictionaries may be used as the criterion for the determination. For example, the limit to the size of the dictionary may be determined in advance with respect to each device so that the difference update process is performed on the corresponding device when the size of the dictionary is smaller than the limit, and that the full data update process is performed on the device when the size of the dictionary is equal to or larger than the limit.

Although all of the content dictionaries are discarded and the full data update process is performed when the number of the content dictionaries exceeds the limit, the present invention is not limited to this, and some of the content dictionaries (old dictionaries) may be discarded to spare free space and the difference update process may be performed using the free space.

Although the embodiment has been explained with the example of ripping CD and storing the text of the music information in the voice recognition dictionary, the present invention is not limited to this, and, for example, the present invention can be applied to storing an address list of a mobile phone. In this case, the contents may be a name, an address, a birthday, and the like. As with the case of the music information, data for the voice recognition dictionary may be obtained with respect to each content to generate and store the content dictionaries in a space prepared for storing the data related to the address list.

When a new piece of data for the address list is stored in the storage unit 2, difference update process is performed when the number of the content dictionaries is smaller than the limit, and, when the number of the content dictionaries is equal to or larger than the limit, the content dictionaries are discarded once, and new content dictionaries are generated to be stored in the voice recognition dictionary.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A voice recognition dictionary generation apparatus comprising:
    an input unit configured to receive a text subjected to voice recognition from an external device or a medium;
    a storage unit configured to store therein the text with respect to each file of a predetermined item;
    a reading data generation unit configured to analyze the text and generate a reading data associated with a pronunciation of the text;
    a voice recognition dictionary configured to include content dictionaries, wherein the reading data associated with the text is stored in the content dictionaries with respect to each file of the predetermined item; and
    a control unit configured to store the text received via the input unit in the storage unit,
    wherein when a file of the predetermined item including the text stored in the storage unit is updated, the control unit detects a total number of the content dictionaries, and when the total number of the content dictionaries is smaller than a predetermined limit, the control unit generates the content dictionaries with respect to each updated predetermined item, thereby updating the voice recognition dictionary; and
    wherein, when the total number of the content dictionaries is equal to or larger than a predetermined limit, the control unit deletes the content dictionaries corresponding to the external device or the medium from the voice recognition dictionary, extracts all texts subjected to the voice recognition corresponding to the external device or the medium from the storage unit with respect to each content, and generates the content dictionaries, thereby updating the voice recognition dictionary.

2. A voice recognition dictionary generation apparatus according to claim 1, wherein the control unit integrates texts with the same name into a single text among the text subjected to the voice recognition to generate the content dictionaries.

3. A voice recognition dictionary generation apparatus according to claim 1, wherein, when the external device or the medium is connected and the text is stored in the file of the predetermined item in the storage unit, the control unit determines that the file of the predetermined item is updated.

4. A voice recognition dictionary generation apparatus according to claim 3, wherein, when the medium is a compact disc (CD), the predetermined item is music information including a title, an artist name, an album title, a composer name, and a genre.

5. A voice recognition dictionary generation apparatus according to claim 3, wherein the external device is a digital audio device or a mobile phone, and the medium is a CD or a digital versatile disc (DVD).

6. A voice recognition dictionary generation apparatus according to claim 5, wherein, in the case where the medium is a CD, the control unit determines that information is updated when there is no artist name that is matched with the music information stored in a item of the artist name in the storage unit, or when there is no composer name that is matched with the music information stored in the item of the composer name in the storage unit.

7. A voice recognition dictionary generation apparatus according to claim 5, wherein, in the case where the medium is a CD, the control unit determines that information is updated when there is no album title that is matched with the music information stored in a item of the album name in the storage unit, or when TOC information is different from that of a matching album title.

8. A voice recognition dictionary generation method comprising the steps of:
    determining whether information in a file of a predetermined item including a text subjected to voice recognition stored in a storage unit is updated;
    detecting a total number of content dictionaries that store therein reading data of the text with respect to each file of the predetermined item when the information in the file of the predetermined item including the text obtained from an external device or a medium and subjected to the voice recognition is updated;
    comparing the total number of the content dictionaries with a predetermined limit;
    extracting the text subjected to the voice recognition corresponding to the external device or the medium with respect to each predetermined item that is updated from the storage unit when the total number of the content dictionaries is smaller than the predetermined limit;
    deleting the content dictionary corresponding to the external device or the medium from the voice recognition dictionary when the total number of the content dictionaries is equal to or larger than the predetermined limit, and extracting all text subjected to the voice recognition corresponding to the external device or the medium from the storage unit with respect to each predetermined item;
    obtaining the reading data by converting the text; and
    updating a voice recognition dictionary by storing the reading data obtained by converting the text.

9. A voice recognition dictionary generation method according to claim 8, wherein obtaining the reading data includes:
  detecting texts having an identical name from among the texts subjected to the voice recognition; and
  integrating the texts having the identical name into a single text.

10. A voice recognition dictionary generation method according to claim 8, wherein determining whether the information in the file of the predetermined item is updated is performed by determining whether the external device or the medium is connected and whether the text is stored in the file of the predetermined item in the storage unit.

11. A voice recognition dictionary generation method according to claim 10, wherein, when the medium is a CD, the predetermined item is music information including a title, an artist name, an album title, a composer name, and a genre.

12. A voice recognition dictionary generation method according to claim 10, wherein the external device is a digital audio device or a mobile phone, and the medium is a CD or a DVD.

13. A voice recognition dictionary generation method according to claim 12, wherein, in the case where the medium is a CD, determining whether the information in the file of the predetermined item is updated includes:
  extracting an artist name from the predetermined item;
  determining whether the artist name is stored in the storage unit; and
  determining that the information is updated when there is no identical artist name.

14. A voice recognition dictionary generation method according to claim 12, wherein, in the case where the medium is CD, determining whether the information in the file of the predetermined item is updated includes:
  extracting a composer name from the predetermined item;
  determining whether the composer name is stored in the storage unit; and
  determining that the information is updated when there is no identical composer name.

15. A voice recognition dictionary generation method according to claim 12, wherein, in the case where the medium is a CD, determining whether the information in the file of the predetermined item is updated includes:
  extracting an album title from the predetermined item;
  determining whether the album title is stored in the storage unit; and
  determining that the information is updated when there is no identical album title.

16. A voice recognition dictionary generation method according to claim 12, wherein, in the case where the medium is a CD, determining whether the information in the file of the predetermined item is updated includes:
  extracting an album title from the predetermined item; and
  determining that the information is updated when TOC information is different from that of a matching album title stored in the storage unit.

17. A voice recognition dictionary generation apparatus comprising:
  a storage unit configured to store therein text subjected to voice recognition with respect to each file of a predetermined item, the text being received from an external device;
  a data generation unit configured to analyze the text and generate pronunciation data associated with the text;
  a voice recognition dictionary configured to include content dictionaries, wherein the pronunciation data associated with the text is stored in the content dictionaries with respect to each file of the predetermined item; and
  a control unit configured to store the text received from the external device in the storage unit, wherein
  when a file of the predetermined item including the text stored in the storage unit is updated, the control unit detects a total number of the content dictionaries, and when the total number of the content dictionaries is smaller than a predetermined limit, the control unit generates new content dictionaries with respect to each updated predetermined item and stores the new content dictionaries generated in the voice recognition dictionary, thereby updating the voice recognition dictionary; and wherein
  when the total number of the content dictionaries is equal to or larger than a predetermined limit, the control unit deletes the content dictionaries corresponding to the external device from the voice recognition dictionary, extracts all texts subjected to the voice recognition corresponding to the external device from the storage unit, generates new content dictionaries for the all texts corresponding to the external device stored in the storage unit, and stores the new content dictionaries generated in the voice recognition dictionary, thereby updating the voice recognition dictionary.

* * * * *